Oct. 6, 1964

P. W. KING ETAL 3,151,397

MEASURING WHEEL

Filed June 15, 1960

INVENTORS.
PATRICIA W. KING
RALPH H. SPURRELL

BY R. E. Geauque

ATTORNEY.

United States Patent Office 3,151,397
Patented Oct. 6, 1964

3,151,397
MEASURING WHEEL
Patricia W. King, Santa Monica, and Ralph H. Spurrell, Los Angeles, Calif., assignors to Rolatape, Inc., Santa Monica, Calif., a corporation of California
Filed June 15, 1960, Ser. No. 36,243
1 Claim. (Cl. 33—141)

This invention relates to measuring instruments of the roller or wheel type for taking lineal measurements and in particular relates to novel and useful improvements in a measuring wheel therefor.

The present invention incorporates certain new features, advantages and results additional to the improvements as covered by United States Letters Patent Nos. 2,557,481 and 2,733,511 and 2,716,819 assigned to the assignee of the present application.

There is shown and disclosed in Patent No. 2,716,819 a measuring wheel by which long distance measurements can be expeditiously made, and over rough terrains, being particularly adapted for road, highway and cross-country distance measurements, the layout of pipe lines, project locations, map checking, surveys, and the like with accuracy and less man hours than possible to effect by a tape line or chain measurements as commonly employed for the purpose. In this prior device the resolution of measurement was limited ultimately by the number of projections extending from the rim of the wheel for actuating a digital counter which indicated the rotation of the wheel from one projection to the next. Normally this resolution of measurement is in feet. Interpolation to fractions of feet, inches, or other small units, may be made by counting the number of spokes in the wheel which traversed the line to be measured between one projection and the next. This method of interpolation is neither convenient nor accurate and may result in confusion inasmuch as the individual spokes are not readily identifiable and may be confused one for another.

A further limitation of the prior invention resides in the relatively high cost of its manufacture and the fragility of the spoked wheel. By means of the present invention there is provided a disc wheel of rugged, yet economical manufacture having provided thereon indicia which may be read directly in order to measure fractions of a revolution of the measuring wheel in numerical increments smaller than those tallied by the digital counter coacting with the projections on the wheel. There is provided in the present invention separate sets of indicia for providing numerical fractions of differing types. For example, one set of indicia may be marked in tenths of feet and the other set of indicia may be marked for indicating inches.

It is, therefore, a principal object of the present invention to provide improvements in a lineal measuring device having a disc measuring wheel of simple and rugged design.

It is another object of the invention to provide a measuring wheel having indicia for measuring small fractions of a single revolution of the measuring wheel.

It is a further object of the invention to provide indicia which will read directly in tenths of feet and indicia which will read directly in inches for use in conjunction with readings obtained from a measuring wheel counter which measures integral numbers of feet or other standard units of measurement.

Still another object of the invention is to provide a disc measuring wheel mounted on a simple and rugged bearing structure and will provide the desired properties of traction, accuracy and long life.

These and other objects of the invention will be more readily understood in connection with the following description and figures in which.

Figure 1:
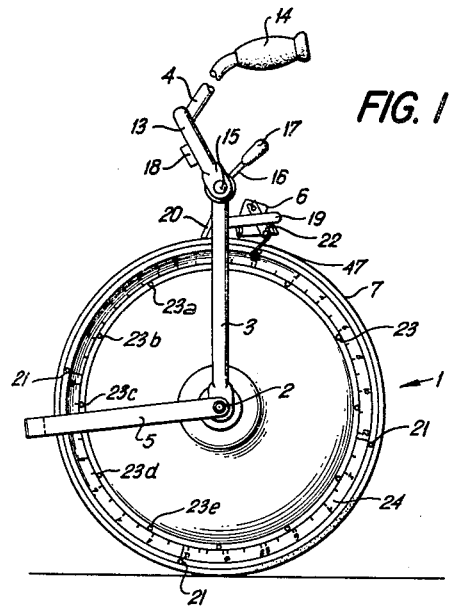
FIGURE 1 is a side elevational view of a measuring instrument embodying the present invention with the wheel in starting position to carry out a measuring operation.

The illustrated embodiment of the inventon shown in the accompanying drawings comprises a measuring wheel member 1 mounted to rotate on axle 2, a wheel fork 3, a wheel handle 4 joined to the fork 3, a stand 5 fixed to the axle 2 and by which the instrument is supported when it rests as on a terrain to be measured, and the measuring recording counter 6.

As here shown the wheel member 1 includes a disc wheel and a wheel rim with a tire 7 of rubber, synthetic rubber, or other suitable semi-resilient material, and attached to the rim and forming the tread of the wheel member. The tire 7 has an annular opening 8 through which passes a wire 9 which is joined at either end to retain the tire on and about the periphery of the wheel rim. The exterior surface or tread of tire 7 is designed to have a circumference which is an integral number of standard units of measurement, and may be, for example, four feet in circumference. The wheel tread thus formed provides good traction and its periphery is accurately calibrated to traverse and indicate a given distance (e.g. 4 feet) per revolution of the wheel.

Figure 4:
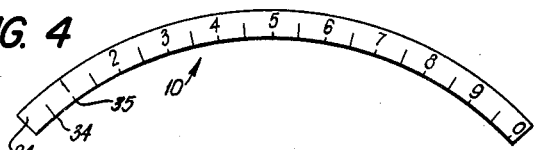
FIGURE 4 is an elevational view of a quarter section of the indicia applied to the wheel disc for measuring fractions of revolutions in tenths of feet.
Figure 5:
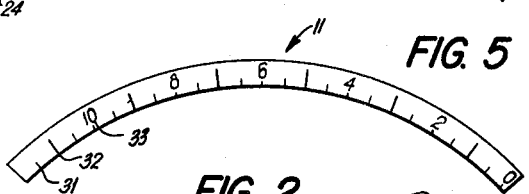
FIGURE 5 is an elevational view showing a quarter section of the indicia for indicating fractions of revolutions of the wheel disc in inches.
Figure 2:
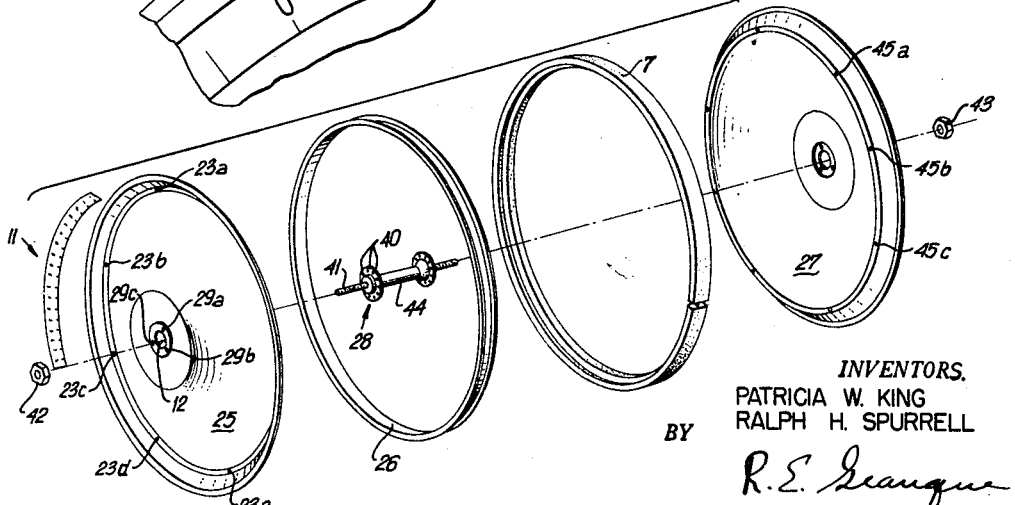
FIGURE 2 is an exploded view of the novel measuring wheel disc, tread, axle and bearing assembly of the present invention illustrating its component parts.

In carrying out the purposes of the present invention, which are primarily the measurement of long distance runs, it has been found, that measuring wheels made in accordance with the improvements of the invention, provide practical measuring units when the wheel periphery measures from 4 to 6 feet. With this relatively long travel per revolution of the wheel a terrain of long distance can be expeditiously traversed and measured. There is also provided by the present invention means for measuring fractions of a foot including fractions of a revolution of the measuring wheel. That is, each revolution of the wheel 1 may, as in the example shown in the illustrated embodiment, provide four feet per revolution and can be read to a fraction of an inch from the indicia 10 and 11 located about the periphery of the wheel. These indicia 10 and 11 may be made up of four separate sections as shown in FIGURES 4 and 5 which are placed about the annular portion of the wheel disc.

The wheel disc comprises a first disc plate 25 which may be conveniently stamped from a single sheet of metal, a formed rim 26, and a second wheel disc plate 27 identical to the first wheel disc plate 25 and symmetrically arranged opposite the first disc and separated by the rim 26. The tire 7 has a small hollow opening 8 running through it and is attached by means of a central wire 9 passing through opening 8 about the rim. Rim 26 is channel-shaped to accommodate tire 7. Located between first disc 25 and second disc 27 is an axle and bearing assembly 28. A plurality of holes 29a, 29b and 29c located about the axle hole 12 carry a plurality of rivets 30 and are used to attach the disc 25 to the axle assembly 28. Rivets 30 pass through mating holes 40 in the bearing assembly 28. Disc 27 is similarly fastened to the opposite side of the bearing assembly 28.

The bearing assembly 28 comprises axle 41 which is threaded at opposite ends for accepting nuts 42 and 43. Stand 5 and wheel fork 3 are retained on the axle 41 by nuts 42 and 43. Member 44 encloses the central portion of the axle and also contains a pair of ball bearings, bushings, or the like for reducing friction between the axle 41 and the wheel.

Figure 3:
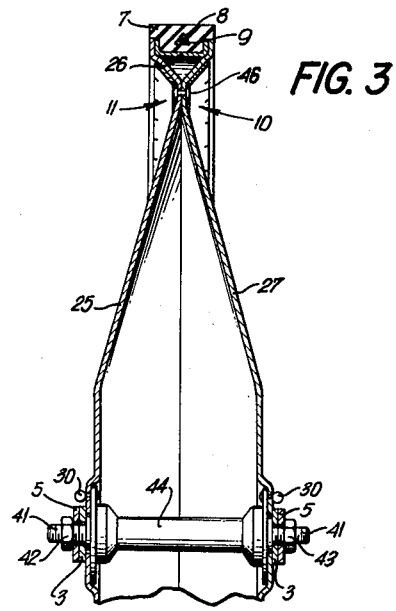
FIGURE 3 is a fragmentary view, partially in section, of the disc wheel showing its mounting on the main bearing and axle, and the construction of the tire.
Figure 6:
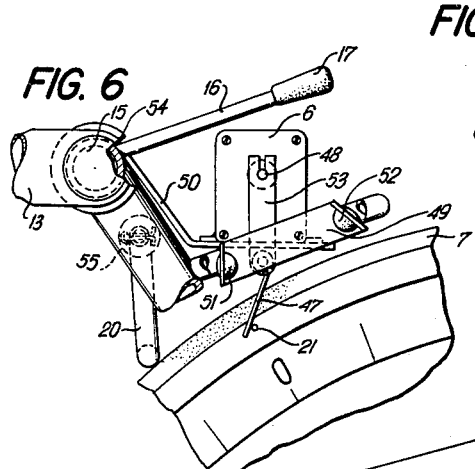
FIGURE 6 is an enlarged fragmentary side elevation of the instrument looking toward the operating side of the measurement recording counter, the wheel rim and the cooperating means between the wheel rim and the counter by which the recording counter is actuated in the traverse of the wheel over the terrain to be measured.

Disc 25 carries a plurality of holes of which 23a, 23b, 23c, 23d, 23e are typical which align with a like number of holes (e.g. 45a, 45b, 45c, etc.) in disc 27 for attaching the discs together near their outer periphery. Rivets such as shown at 46 in FIGURE 3 or other suitable fasteners pass through these aligned holes to join the discs together. It will be obvious, however, that other suitable means may be used to provide this joiner.

Disc 25 carries four projections 21 near its outer periphery which are used to actuate the digital counter to indicate quarter revolutions of the measuring wheel. Inasmuch as the measuring wheel traverses four feet for each revolution, each projection 21 will actuate the counter to indicate one foot of linear travel. A quarter-circle section of indicia, such as identified by the numeral 11, is located between each two projections 21. Since the arcuate distance between any two projections 21 corresponds to one foot of travel, the quarter-circle section of indicia 11 is marked to correspond to subdivisions of one foot of travel. Indicia 11 is divided into inches, and fractions of inches. In the example shown in FIGURE 5, the smallest index marks 31 correspond to half inches, the next larger index marks 32 and the cardinal number marks 33 correspond to whole inches. The indicia 10 and 11, for convenience and economy of manufacture, may be fabricated from a vinyl plastic material which is bonded to the wheel discs 25 and 26 by a suitable adhesive. This material will provide a durable weather-proof graduated scale which may be easily read. The indicia 10 and 11 are repeated four times about the disc 25 and 27 with indicia 11 being applied to one side of the wheel such as disc 25 and indicia 10 being applied to the opposite side of the wheel such as disc 27. Indicia 10 are divided into decimal increments of feet with the smallest index mark 34 being 0.05 feet and the cardinal index marks 35 being 0.1 feet increments.

Projections 21 are spaced evenly around wheel rim 7; for example, in the present instance at one foot intervals. These projections 21 are arranged to co-act with the measurement counter 6 by engaging spring 47 which is in turn connected to dial operating shaft 48 of the counter 6 via lever arm 53. The counter 6 is secured to bracket 50 which in turn is fastened to cross member 54. Bracket 50, fastened to cross member 54, is held in position so as to align spring 47 in close proximity to the side face of the wheel rim around which the projections 21 are placed. Bracket member 49 is fitted with a pair of cushioning bumpers 51 and 52 made of neoprene or other resilient material which absorb the shock of the counter lever arm 53 at each end of its stroke.

Spring 47 and the projections 21 on the face of the wheel 1 provide the coordinating means by which the measurement counter 6 is operated, the depending end of spring 47 being of length and aligned so as to contact projections 21 in the forward traverse of the wheel; the projections 21 picking up the spring end of the counter lever arm 53 and moving it to record the measurement on the counter 6.

The counter 6 employed is of the well-known Veeder type having a series of number wheels which accumulate and display the total number of times the counter lever arm 53 is actuated. The Veeder type counter is readily obtainable in the market and is known for its reliability and operation although any equivalent measuring and recording device may be utilized. Additional details of the counter 6 and its related mounting structure are substantially the same as shown in FIGURES 4–7 of Patent No. 2,716,819 assigned to the same assignee. In the present illustrative embodiment, the counter will indicate four readings at intervals of one foot, for each revolution of the wheel 1, indicating that four feet have been traversed in the rolling of the wheel over the terrain being measured.

It will, of course, be clear that any suitable number of projections on the wheel may be used in carrying out the purpose of the invention such that they will actuate the counter and record thereon the distance traversed so that when desired the recorded measurements may be made in units of feet and/or fractions of feet.

The wheel forks 3 are joined rigidly together at their upper ends by a cross member 54 which is positioned directly over the wheel tread and held in place by bolt 15. The cross member 54 provides the mounting for yoke 13.

As can be seen from FIGURE 1, a handle is provided having yoke 13 on one end and a straight extending shaft portion 4 terminating in a hand-gripping member 14. The yoke end of the handle is movably connected to cross member 54 by bolt 15. Handle 17 carried on extension 16 is attached to a nut on bolt 15 which serves to tighten and secure the handle after being rotated by cross member 54 to a suitable operating position. This arrangement in effect provides a hinge connection between the handle and the forks with means of locking the hinge after it is set.

The measuring wheel 1 is provided with a brake 20 which will prevent reversal of the wheel movement rearwardly during measurement. This will prevent a reverse motion of the wheel from causing the damage to the counter 6 and the cooperating elements which actuate it. Brake 20 is movably mounted between the wheel forks 3 at the upper end thereof so that it will engage the face of the tire 7 and in such manner that the wheel will readily pass through the brake in the forward rolling movement of the wheel but is fully prevented from rolling in the opposite rearward direction. The brake 20 is lightly held against the tire 7 being spring actuated about pivot 55 in the present embodiment. The brake 20 is continuously in contact with the tire 7 and also serves as a scraper for freeing the tire tread of dirt or foreign matter, which might accumulate on the tread in the measurement of terrain where the soil is damp or sticky, such as clay and adobe soil.

It will not be apparent that the improvements of the present invention provide a simple, practical and highly efficient measuring wheel instrument; the utility of the device is greatly extended, and in fact to the extent that greater resolution of measurement may be obtained than with similar devices proposed heretofore.

While a particular embodiment of the invention has been shown and described, it will be obvious to those skilled in the art that modifications may be made without departing from the intended scope of the invention as set forth in the appended claim.

We claim:

A measuring wheel of large diameter for measuring long distances, means mounting said wheel on an axle and a handle having connections with the axle for rolling the wheel over a terrain, said wheel having affixed to a face thereof, near the periphery of the wheel, an arcuate scale divided into feet and subdivisions thereof, said scale including in length a multiple number of feet with each foot of the scale imprinted on a separate arcuate strip of material, said arcuate strips when positioned on the wheel near the periphery thereof abutting one another, pins on said wheel, one at the juncture of each arcuate strip, and a counter carried by the handle having an operating member in the path of the pins on the wheel.

(References on following page)

References Cited in the file of this patent

UNITED STATES PATENTS

| | | | |
|---|---|---|---|
| 1,343,751 | Simmons | June 15, | 1920 |
| 1,489,054 | Baumler | Apr. 1, | 1924 |
| 2,123,360 | Harris | July 12, | 1938 |
| 2,129,979 | Westervelt et al. | Sept. 13, | 1938 |
| 2,606,076 | Frazer | Aug. 5, | 1952 |
| 2,733,511 | Staples et al. | Feb. 7, | 1956 |
| 2,741,031 | Martin | Apr. 10, | 1956 |
| 2,932,897 | Huber | Apr. 19, | 1960 |

FOREIGN PATENTS

| | | | |
|---|---|---|---|
| 384,791 | Great Britain | Dec. 15, | 1932 |